United States Patent
Vaughan (10) Patent No.: US 7,530,091 B2
(45) Date of Patent: May 5, 2009

(54) VOIP DROP AMPLIFIER

(75) Inventor: Jay Vaughan, Gilbert, AZ (US)

(73) Assignee: PCT International, Inc., Gilbert, AZ (US)

( * ) Notice: Subject to any disclaimer, the term of this patent is extended or adjusted under 35 U.S.C. 154(b) by 669 days.

(21) Appl. No.: 11/182,738

(22) Filed: Jul. 18, 2005

(65) Prior Publication Data
US 2006/0015921 A1 Jan. 19, 2006

Related U.S. Application Data

(60) Provisional application No. 60/589,337, filed on Jul. 19, 2004.

(51) Int. Cl.
 H04N 7/173 (2006.01)
 H04J 1/02 (2006.01)
(52) U.S. Cl. .................. 725/106; 725/127; 725/126; 725/105; 370/493
(58) Field of Classification Search ............ 725/106, 725/105, 126, 127; 370/493
 See application file for complete search history.

(56) References Cited

U.S. PATENT DOCUMENTS

| | | | |
|---|---|---|---|
| 5,016,244 A | 5/1991 | Massey, Jr. et al. | |
| 5,696,895 A | 12/1997 | Hemphill et al. | |
| 6,075,784 A | 6/2000 | Frankel et al. | |
| 6,175,565 B1 | 1/2001 | McKinnon et al. | |
| 6,202,169 B1 | 3/2001 | Razzaghe-Ashrafi et al. | |
| 6,373,817 B1 | 4/2002 | Kung et al. | |
| 6,477,197 B1 | 11/2002 | Unger | |
| 6,640,239 B1 | 10/2003 | Gidwani | |
| 6,671,253 B1 | 12/2003 | Alexander, Jr. et al. | |
| 6,690,789 B1 | 2/2004 | Hamilton | |
| 6,735,302 B1 * | 5/2004 | Caine et al. ............ | 379/405 |

(Continued)

FOREIGN PATENT DOCUMENTS

JP 2004-80483 3/2004

(Continued)

OTHER PUBLICATIONS

"Clipcomm CP-100P," VOIPSupply.com http://www.voipsupply.com/product_info.php?products_id=305, 2 pages printed from Internet Jun. 6, 2005.

(Continued)

Primary Examiner—Christopher Kelley
Assistant Examiner—Franklin S Andramuno
(74) Attorney, Agent, or Firm—Richard C. Litman (57) ABSTRACT

The VOIP drop amplifier connects end user equipment to a broadband system, such as that provided by a cable provider. The amplifier includes a splitter for connecting the cable signal to multiple output connectors, and RF amplifiers compensating for losses in the splitter and other passive components in the amplifier. The drop amplifier includes an input connection for accepting a broadband cable signal from a cable system and returning broadband signals to the cable system. The drop amplifier includes an amplification path connecting the input connection to the plurality of output connections through RF amplifiers and a splitter, and a bypass path that bypass the splitter and forward and reverse amplifiers in the amplification path to connect the input connection directly to the output connection for the essential circuits. A sensing circuit monitors the amplifiers and the supply voltages, and selects the bypass path when a failure is detected.

6 Claims, 5 Drawing Sheets

U.S. PATENT DOCUMENTS

| | | |
|---|---|---|
| 6,785,907 B1 | 8/2004 | Dan et al. |
| 6,839,829 B1 | 1/2005 | Daruwalla et al. |
| 2002/0101817 A1 | 8/2002 | Teixeira |
| 2002/0101818 A1 | 8/2002 | Teixeira |
| 2003/0066082 A1* | 4/2003 | Kliger et al. .................. 725/80 |
| 2003/0214939 A1 | 11/2003 | Eldumiati et al. |
| 2004/0027992 A1 | 2/2004 | Volkening et al. |
| 2004/0170160 A1* | 9/2004 | Li et al. ...................... 370/352 |
| 2005/0169056 A1* | 8/2005 | Berkman et al. ....... 365/185.22 |

FOREIGN PATENT DOCUMENTS

| | | |
|---|---|---|
| JP | 2005-5875 | 1/2005 |

OTHER PUBLICATIONS

"VOIP/PSTN 2-Line Intelligent Switch (Gateway/Phone/ATA)," eBay.com http://cgi.ebay.com/ws/eBayISAPI.dll?ViewItem&item=5193203853&category=11188, 7 pages printed from Internet on Jun. 6, 2005.

"Epygi Quadro 16x #16209," The VOIPConnection.com http://www.thevoipconnection.com/store/customer/product.php-?productid=16209&cat=255&page=1, 2 pages printed from Internet on Jun. 6, 2005.

\* cited by examiner

VOIP DROP AMPLIFIER

CROSS REFERENCE TO RELATED APPLICATION

This application claims the benefit of U.S. Provisional Patent Application Ser. No. 60/589,337, filed Jul. 19, 2004.

BACKGROUND OF THE INVENTION

1. Field of the Invention

The present invention relates to cable television systems, and particularly to splitter/amplifier systems for delivering diverse communication services, including voice over IP (VoIP) telephone services.

2. Description of the Related Art

Cable television operators provide a variety of diverse services to consumers. These services include high speed Internet access, video on demand, pay-per-view services, and VoIP services. Cable operators provide these services multiplexed over a single cable using such techniques as frequency division multiplexing (FDM). These services are characterized by the need to provide forward and reverse communication path. The forward path is used to transmit data to the user, while the reverse path is used to return data to the cable operator. The return data might include orders for video on demand or pay-per-view content or data transmitted by the user for destinations on the Internet.

Key components of CATV systems are drop amplifiers. These amplifiers are inserted into the cable transmission path to make up for losses in the transmission system. Signals are weakened as they pass through cables and components, such as splitters. Splitters are used to separate the services provided by the cable operator for distribution to the appropriate customer equipment for receiving the service.

Typically the return signal operates at a comparatively lower frequency than the forward path. For example, in a typical system the return signal is in a bandwidth of 5 MHz to about 40 MHz, while the forward path operates at 50-1000 MHz. Diplex filters are used to separate the combined forward and return signal into separate components for amplification using separate amplifiers. In some cases the signal level in the reverse path may be sufficiently high so that no reverse path amplifier is required. For example, set top boxes and cable modems typical provide high output levels, making the reverse path amplifier unnecessary.

Among the services provided by the cable provider, it is particularly important that the voice over IP (VoIP) service be reliable. While such services as video on demand or pay-per-view are viewed as luxury or non-essential services, VoIP is used to provide telephone communications. Telephone communication are viewed as vital services, particularly during situations involving medical emergencies or natural disasters where communications may be necessary to make essential reports, such as injuries, life threatening medical conditions, or downed power lines. The VoIP circuits may be viewed as essential services because of the need to maintain the circuits in emergency situations.

Because the amplifiers used in the systems are active components employing complex circuitry and requiring electrical power to operate, the drop amplifiers are potential failure points for VoIP services. In some situations, an emergency or disaster that requires the use of the VoIP services also results in a loss of electrical power, disabling the drop amplifiers and interrupting vital VoIP communications.

Several devices have been developed for VoIP systems. A representative device is shown in Japanese Patent No. 2004-80,483, published Mar. 11, 2004, which shows in FIG. 1 a VoIP adapter for telephone communications that switches from a telephone line network, such as a packet switched telephone network, to a VoIP network to maintain communications when a failure in the telephone line network is detected. Another representative device is shown in Japanese Patent No. 2005-5,875, published Jan. 6, 2005, which also shows in FIG. 1 a device for switching from a telephone line network, such as a packet switched telephone network, to a VoIP network to maintain communications when a failure in the power supply for the telephone line network is detected.

While the above-mentioned patent references describe circuit monitoring and switching to maintain telephone communications, neither describes maintaining VoIP communications despite failure of components in an IP network providing the VoIP infrastructure.

None of the above inventions and patents, taken either singly or in combination, is seen to describe the instant invention as claimed. Thus, a VOIP drop amplifier solving the aforementioned problems is desired.

SUMMARY OF THE INVENTION

The VoIP drop amplifier connects end user equipment to a broadband system, such as that provided by a cable provider. The amplifier includes a splitter for connecting the equipment to multiple output connectors, and RF amplifiers compensating for losses in the splitter and other passive components in the drop amplifier. The drop amplifier includes an input connection for accepting a broadband cable signal from a cable system and returning broadband signals to the cable system. The drop amplifier includes an amplification path connecting the input connection to a plurality of output connections through amplifiers and a splitter, and a bypass path that bypasses the splitter and the forward and reverse amplifiers in the amplification path to connect the input connection directly to the output connection for VoIP. A sensing circuit monitors the amplifiers and the supply voltages and selects the bypass path when a failure is detected.

The amplification path includes a forward amplifier for amplifying the forward signals, which are signals originating at the cable operators system, and a reverse amplifier for amplifying the reverse signals, which are those signals originating at the end user's equipment.

The VoIP amplifier further includes a switch circuit for selecting between the amplification path and the bypass path. The switching circuit is controlled by a dc current and voltage sensing circuit.

The dc current and voltage sensing circuit monitors dc voltage supplied to the amplifier circuitry. The sensing circuitry also monitors the current supplied to the forward and reverse amplifiers, or to the forward amplifier alone when the reverse amplifier is not provided in the amplification path. The dc voltage supplied to the VoIP circuitry is compared to a reference value to determine whether the dc voltage is sufficient to operate the VoIP active components. When the dc voltage is insufficient the dc current and voltage sensing circuit operates the switching circuit to select the bypass path.

The amplifier current is compared to two reference values to determine whether the current is within a range including a lower and an upper current limit. When the amplifier current is outside this range, which corresponds to the normal range of expected amplifier currents, the dc current and voltage circuit operates the switching circuit to select the bypass path.

Under normal voltage and current conditions, the dc current and voltage sensing circuit controls the switching circuitry to select the amplification path. The bypass path supplies only the VoIP output or other output connections designated as essential, while the amplification path supplies all of the output connections including the essential and non-essential connections. In a typical case, only the VoIP output is designated as essential.

The forward and reverse amplifiers may provide sufficient gain to compensate for losses in VoIP drop amplifier. Alternatively, these amplifiers may provide additional gain to compensate for losses elsewhere in the cable system, such as losses in the cable connecting the VoIP to the cable operator's system.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a drop amplifier designed to reliably maintain the VoIP signal path during a loss of power or a failure of active amplifying components.

Figure 1:
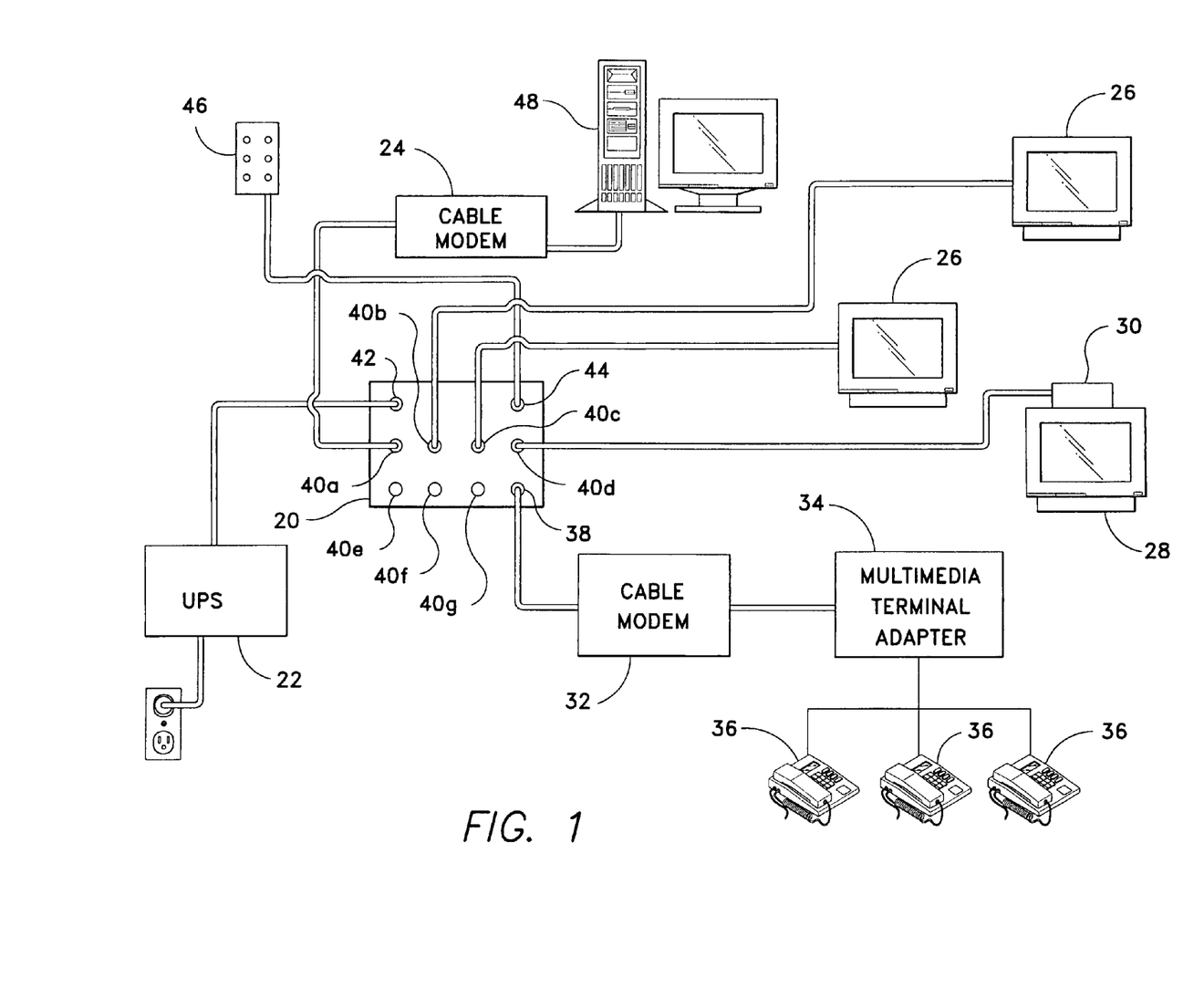
FIG. 1 is a block diagram of a typical CATV system incorporating a VOIP drop amplifier according to the present invention.

FIG. 1 illustrates a system employing a VoIP drop amplifier according to the invention. The cable operator provides communication services to a multi-tap point 46. The VoIP drop amplifier is connected to the multi-tap connection via a cable that is connected to the RF signal input connector 44. The VoIP drop amplifier provides amplification for the forward and return signals and splits the signals, delivering them to the output connectors 38 and 40a-40g.

Connected by cables to the output connectors are various devices for utilizing broadband cable service. Connected to output connector 40a is a cable modem 24 supplying an Internet connection for a personal computer 48. Two integrated digital televisions 26 are connected to output connectors 40b and 40c. IDTV sets are television sets with the ability to interface with a broadband network to receive such services as video on demand (VOD) or electronic program guide (EPG), as well as broadcast TV. Output connector 40d is connected to a set top box 30, which in turn is connected to a conventional television set 28. Output connector 40d is connected to a set top box 30 that in turn is connected to a conventional (non iDTV capable) television set 28. A set top box is common for televisions without iDTV capability. The set top box interfaces with broadband networks to deliver such services as VOD and EPG to conventional television sets.

The VoIP connector 38 is connected via a cable to a second cable modem 32, which is connected to a multimedia terminal adapter (MTA) 34. The MTA is connected to one or more VoIP telephones 36. The remaining output connectors 40e-40g are shown as unused, but may be connected to additional devices. For example, an additional cable modem and MTA may be connected to one of the unused connectors to provide additional VoIP telephone service, or a third cable modem for Internet access may be connected to one of the unused output connectors.

The VoIP drop amplifier 20 is shown powered by an uninterruptible power supply (UPS) 22, which provides power to the VoIP drop amplifier 20 via the input connector 42. Alternatively, power may be provided to the VoIP drop amplifier 20 from a simple wall transformer.

Figure 2:
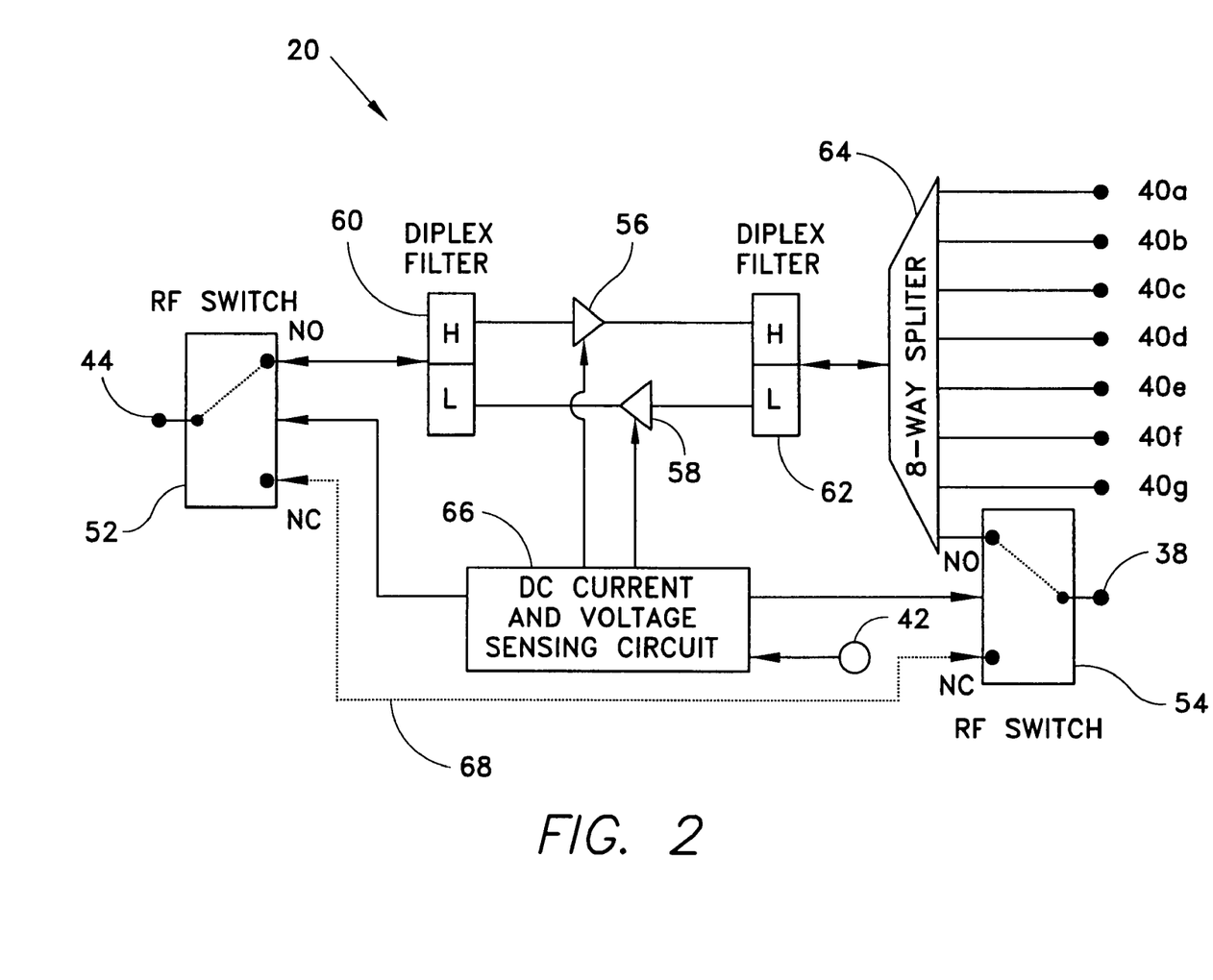
FIG. 2 is a functional block diagram of the VoIP drop amplifier according to the present invention operating under normal operating conditions.
Figure 3:
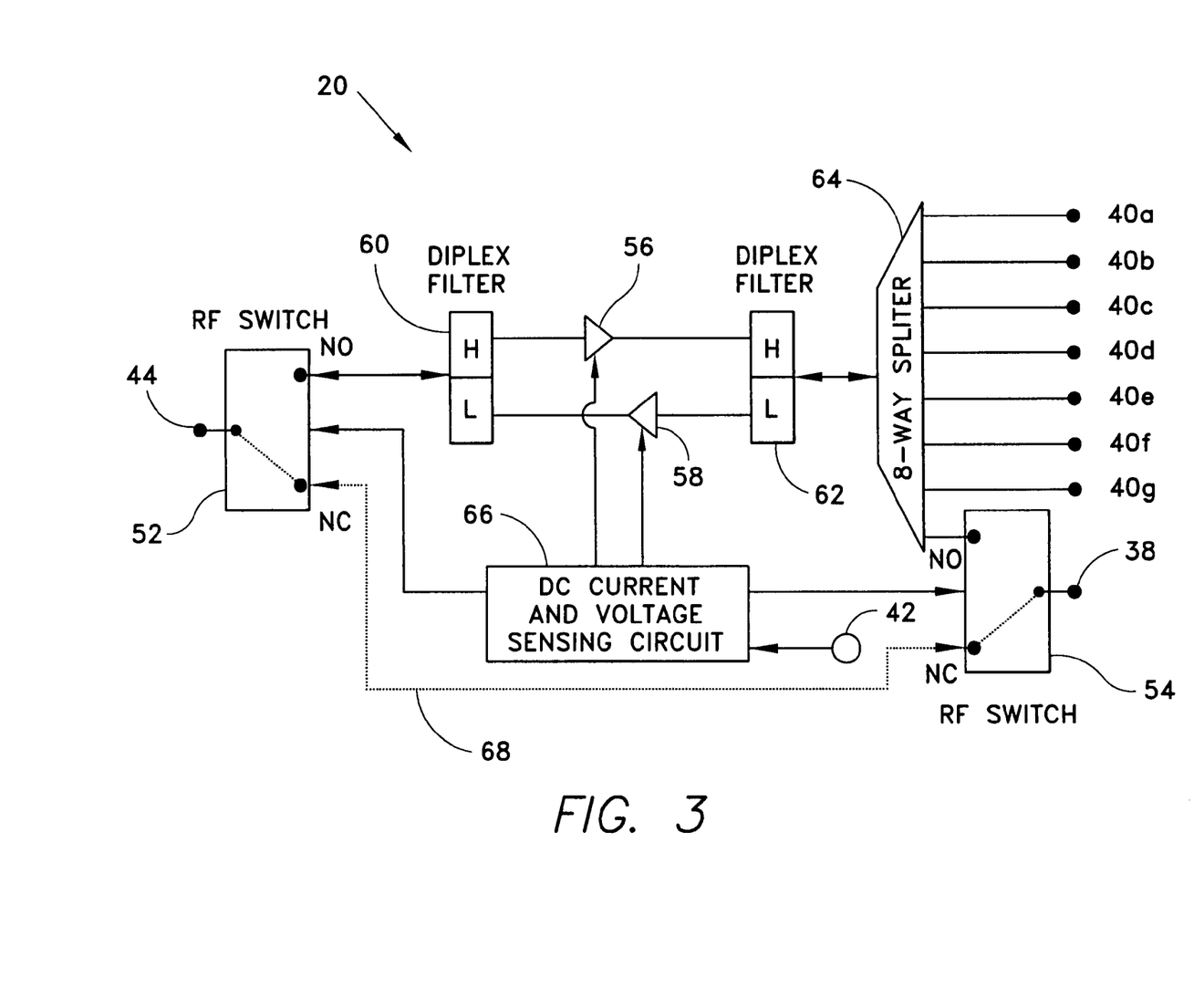
FIG. 3 is a functional block diagram of the VoIP drop amplifier according to the present invention switched to the bypass operating condition after detecting a fault in the system.

FIGS. 2 and 3 are block diagrams by which the basic operating principles of the VoIP drop amplifier 20 may be understood. FIG. 2 shows the amplifier in the normal condition, while FIG. 3 shows the amplifier in a bypass condition.

As shown in FIG. 2, the RF signal to and from the cable system is routed through the input connector 44 to a first bypass switch 52. A switch circuit comprises this first bypass switch 52, as well as a second bypass switch 54 described below. The switch circuit is controlled by dc current and voltage sensing circuitry 66. When the dc current and voltage sensing circuitry 66 detects that the amplifier and voltage supply is normal, the switch circuit routes the RF signal through the amplification path. To set up the amplification path, the first bypass switch 52 is set to pass the incoming signal to the first diplex filter 60. The diplex filter separates the signal into the downstream (50-1000 MHz) signal component coming from the cable system and the upstream (5-40 MHz) signal component coming from the customer's equipment, which is directed back to the cable system. A separate upstream amplifier 56 and a downstream amplifier 58 are provided to make up for losses in passive drop amplifier components and provide unity gain. The downstream signal component originates at the cable supplier, passes through the normally open contact of the first bypass switch 52, the first diplex filter 60, the high frequency amplifier 56, the second diplex filter 62, and into the splitter 64. After subdividing at the splitter 64, the signal is routed to the various consumer equipment, as shown in FIG. 1, with the exception of the VoIP telephone equipment. The path to the VoIP connector, after passing through the splitter 64, also passes through the second bypass switch 54. With the second bypass switch 54 in the energized condition, the downstream signal passes through the normally open contacts of the second bypass switch 54 and then to the VoIP output connector 38.

The path for the reverse signal, originating at the consumer equipment is into the connectors 40a-40g through the splitter 64, into the second diplex filter 62, through the low frequency amplifier 58, then through the first diplex filter 60 and through the normal open contacts of the first bypass switch 52. The VoIP reverse signal first passes though the normally open contacts of the second bypass switch 54 before entering the splitter 64.

Preferably, the drop amplifier will provide unity gain (0 db), with losses in the passive components, such as connectors, diplex filters and splitters, being compensated for by the amplifier circuitry comprising the forward amplifier 56 and return amplifier 58. Alternatively, additional gain may be provided by the forward and return amplifiers 56 and 58 to make up for losses external to the VoIP drop amplifier 20.

When an abnormal condition, such as a loss of power to the VoIP drop amplifier or an abnormal operating condition of the RF amplifiers 56 and 58, is encountered, the dc current and voltage sensing circuit 66 switches the bypass switches 52 and 54 to the normally closed condition, as shown in FIG. 3. In this condition, the path through the diplex filters 60 and 62, the amplifiers 56 and 58, and the splitter 64 is opened completely, isolating these components from the signal path. In this condition, the bypass path 68 is activated, connecting only the VoIP output connection to the cable system. If the overall gain in the normal condition was unity (0 dB), isolating the components and connecting the input connector 44 directly to the VoIP output connector 38 will restore an essentially lossless communication path through the VoIP drop amplifier 20 for the VoIP consumer telephone equipment while removing service from the other consumer equipment.

Figure 4:
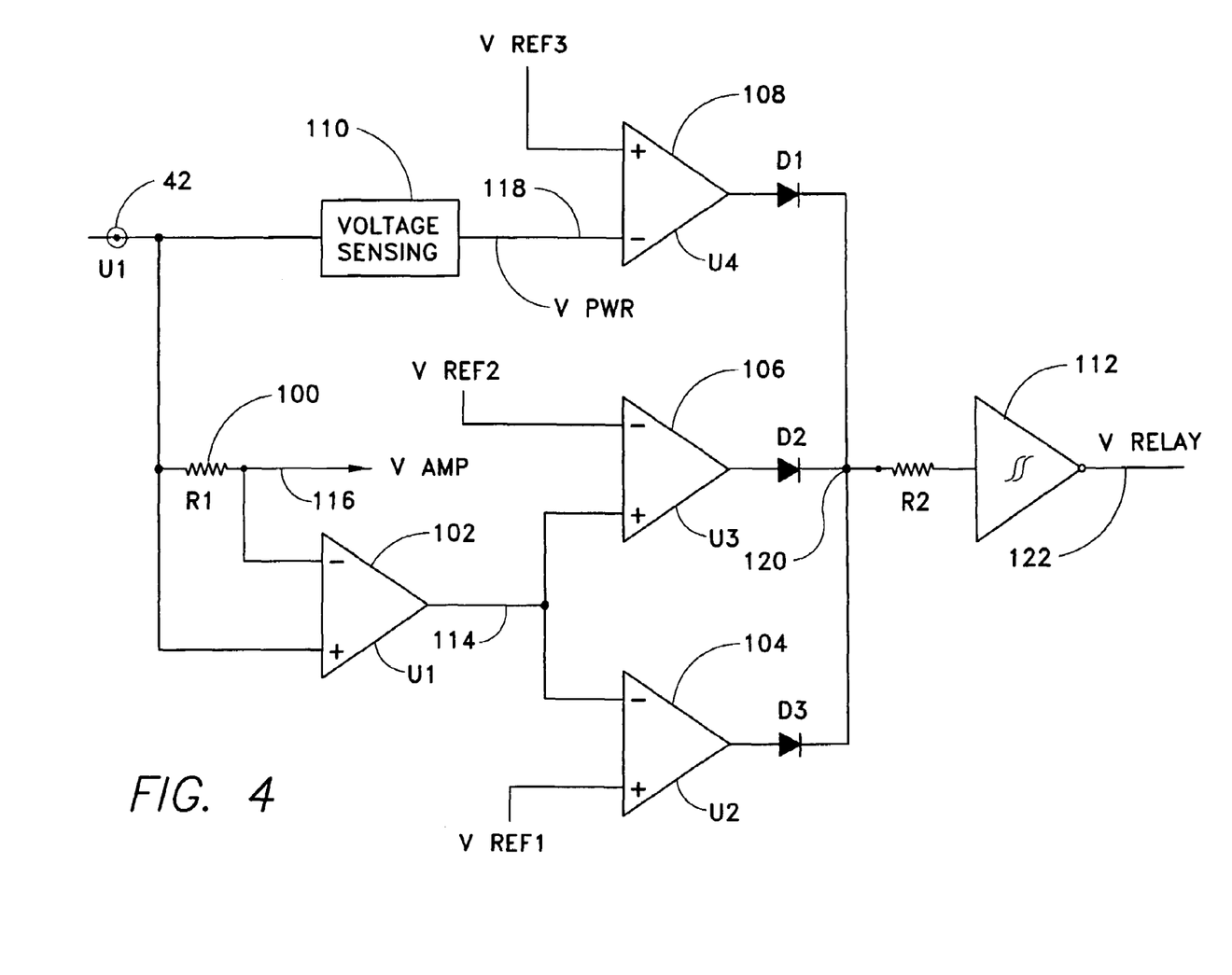
FIG. 4 is a simplified schematic diagram of an embodiment of current and voltage sensing circuitry that may be used in the VoIP drop amplifier according to the present invention.

By referring to the simplified schematic diagram of FIG. 4, the operation of dc current and voltage sensing circuitry can be understood.

The dc current and voltage sensing circuit 66 monitors the current provided to the low and high frequency amplifiers 56 and 58 (see FIGS. 2 and 3), as well as the dc power supplied to the VoIP drop amplifier. The amplifier voltage is sampled at the VoIP power supply connector 42 via a voltage sensing circuit. The voltage sensing circuit 110 filters the dc voltage and scales the voltage using a voltage divider or other technique known in the art. The voltage at point 118 is then a scaled value representative of the voltage provided to the unit. This voltage is compared to a reference voltage V REF3 at a first voltage comparator circuit 108. If the scaled voltage falls below the reference voltage, indicating that the supply power is failing or has failed, the voltage comparator 108 generates a high output signal as its output.

The power supplied to the RF amplifiers (56 and 58 in FIGS. 2 and 3) passes through a sampling resistor R1, also designated 100 in FIG. 4. The ohmic value of the sampling resistor 100 is small, so that the voltage drop across the resistor 100 does not interfere with proper operation of the RF amplifiers 56 and 58 by lowering the voltage supplied to the amplifiers at path 116. The resistor 100 is large enough that the voltage drop across the resistor 100 is easily measurable in the current sensing circuitry. The voltage drop across the sampling resistor R1 is amplified at an amplifying stage 102, which generates at output 114 a voltage proportional to the combined current drawn by the RF amplifiers, and the amplifier output 114 is provided to a high current limit comparator 106 and a low current limit comparator 104. In each circuit the RF amplifier supply current, represented by voltage output 114, is compared to a reference value (V REF1 or V REF2). If the current exceeds a high current limit value, the high limit comparator 106 generates a high voltage output value, and if the current drops below the low current limit reference value, the low limit comparator 104 generates a high voltage output signal. When the current is between the high and low levels, the high and low limit comparators generate a low voltage output. The high and low current limits are selected so that when the current draw anticipated for the RF amplifiers 56 and 58 is outside normal limits, the respective current comparator 104 or 106 generates a high output signal.

The outputs from the high limit comparator 106, low limit comparator 104, and the voltage comparator 108 are summed at common connection point 120. If any of the three comparators generates a high-level voltage output, a Schmidt trigger circuit 112 trips to removes the voltage supplied at point 122. Otherwise the Schmidt trigger circuit 112 generates a dc output signal, V RELAY, at path 122. The voltage at path 122 is used to control the bypass switches 52 and 54 of the VoIP drop amplifier 20. The hysteresis of the Schmidt trigger 112 results in the reset point of the Schmidt trigger 112 being appreciably lower than the trigger voltage, which prevents the bypass switches 52 and 54 from cycling between the normal and the bypass condition when the sensed voltage and current values undergo small fluctuations.

Figure 5:
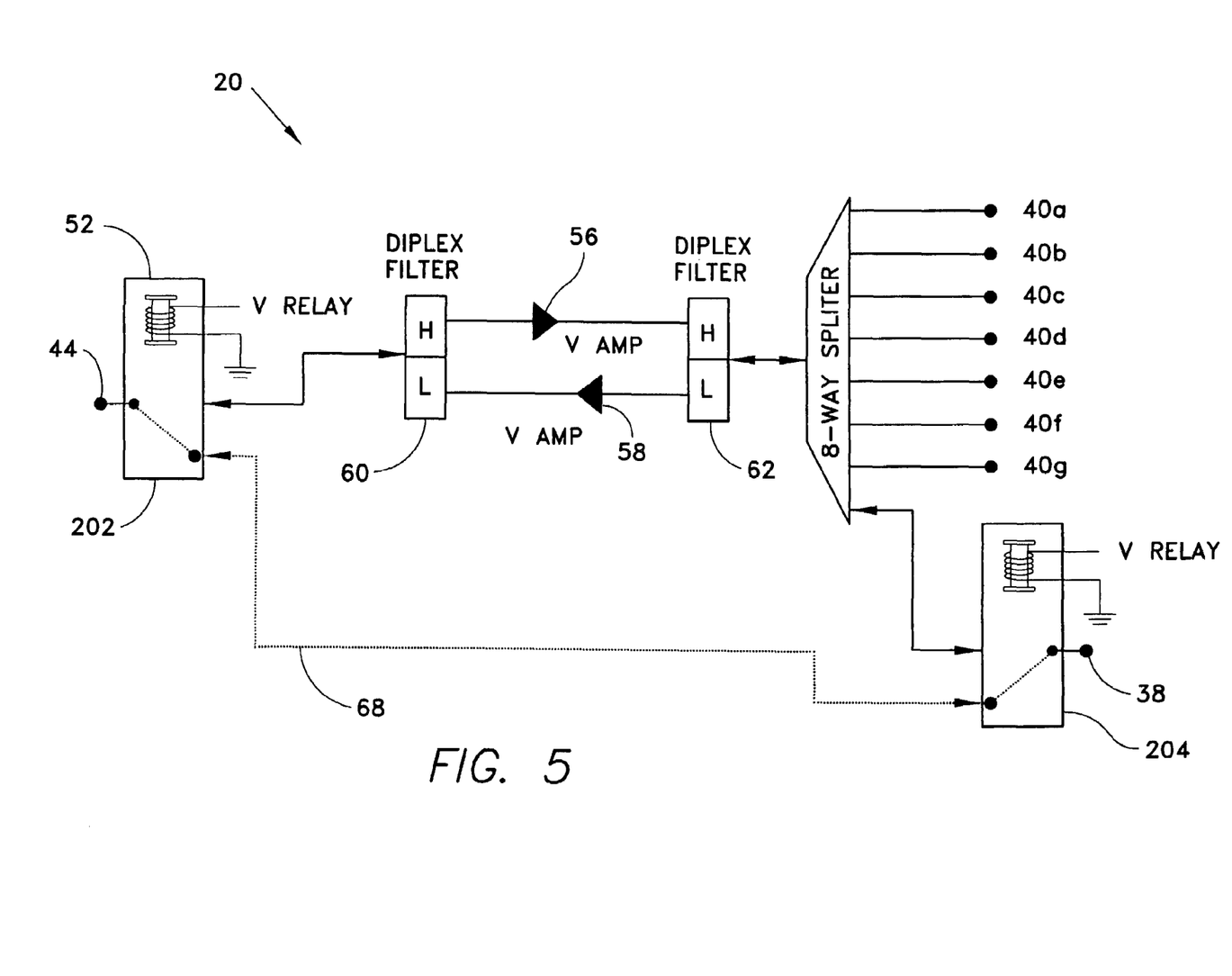
FIG. 5 is a simplified schematic diagram of an embodiment of a VoIP drop amplifier according to the present invention using relays as the bypass switches.

FIG. 5 is a simplified diagram showing an implementation of the bypass circuitry using relays as the bypass switch 52 and 54 components. Each relay is a single pole double throw (SPDT) type with a common pole that is connected to the normally closed contact when the relay coil is de-energized. When the relay coil is energized, the common pole is disconnected from the normally closed contact and connected to the normally opened contact. Alternatively, a single double pole double throw (DPDT) relay can provide the functionality of the pair of SPDT relays.

As shown in FIG. 5 the voltage V RELAY, which is the output of the voltage sensing circuit 66 as shown in FIG. 4, is applied to the relay coils of two SPDT relays 202 and 204. The common pole of the first relay 202 is connected to the cable system input connector 44 of the VoIP drop amplifier 20. When the voltage sensing circuit 66 provides a high level output voltage for V RELAY, the relay coil of the first relay 202 is energized, connecting the input through the first diplex filter 60, the high and low frequency amplifiers 56 and 58, the splitter 64, and to each of the output connectors 40a-40g. The coil of the second relay 204 is also energized, closing its normally open contact. The second relay 204 completes the path through the splitter 64 and to the VoIP output connector 38.

When the sensing circuit 66 detects a loss of power supply voltage or improper amplifier operation, the V RELAY voltage will be deactivated as described above, resulting in the coils of the bypass relays 202 and 204 becoming de-energized. When the relay coils are de-energized, the signal path through the amplifiers 56 and 58 and splitter 64, or the amplification path, is isolated by opening of the normally open relay contacts. The normally closed contacts of the bypass relays 202 and 204 are then closed to complete a bypass path 68, connecting the cable system to the VoIP output 38. Because the splitter 64 is bypassed in this condition, the bypass path 68 is nearly lossless. If the VoIP drop amplifier 20 is designed for unity gain, the VoIP output connector 38 will be supplied with essentially the same signal level in the bypass condition as in the normal condition. Non-essential consumer equipment, such as the PC Internet connection, will be disconnected from the cable signal when the VoIP drop amplifier 20 is in the bypass condition.

A complete loss of all power supplied to the VoIP drop amplifier 20 will result in disabling the voltage and current sense circuitry 66. Because the bypass path through the amplifier 20 is selected using the normally closed contacts of the bypass switches 52 and 54, the loss of power to the VoIP drop amplifier 20 will result in bypassing the de-energized active circuitry and the splitter 64 of the drop amplifier 20, thus maintaining a loss-free connection to the consumer's VoIP telephone equipment.

In an example implementation, the reverse amplifier 58 comprises an RF Micro Devices RF2317 integrated circuit based RF amplifier, while the forward amplifier 56 comprises an ANADigics Inc. ADA10000 integrated circuit based broadband RF amplifier. The comparator circuits 104, 106, and 108 are implemented using conventional operational amplifier circuits, such as the LM2900. The current supplied to the two RF amplifier circuits passes through a 1-ohm resistor 100, developing a voltage across the resistor 100 proportional to total amplifier current. This voltage is compared to reference voltage supplied to the current comparators 104 and 106 to implement the high and low current limits described above. The low current limit is approximately 180 milliamps (mA), while the high current limit is at approximately 300 mA. The nominal expected current draw for the amplifier circuitry is 250 mA. The current limit values are chosen to be consistent with the range of expected currents for the particular amplifier circuits used in the VoIP drop amplifier 20. When amplifier current is outside of the expected range of values, the dc current and voltage sensing circuit 66 removes the voltage to the coils of the bypass relays 52 and 54, switching the circuit into the bypass condition described above. After a trip due to an out-of-range current, the VoIP resets when the current increases to 200 mA or decreases below 280 mA due to the hysteresis of the Schmidt trigger 112 circuitry. The voltage sensing circuitry conditions the incoming voltage using filters and surge suppressors, and then employs a voltage divider network to provide a voltage proportional to the supply voltage. This voltage is compared to a reference voltage developed from an integrated circuit voltage regulator to establish the low voltage trip point. The low voltage limit is approximately 13 volts, with the normal supply voltage for the VoIP being 15-volts dc. When the supply voltage drops below the low voltage limit, the voltage and current sensing circuit 66 removes the voltage to the coils of the bypass relays 52 and 54, switching the circuit into the bypass condition described above. After a trip due to a low supply voltage, the VoIP resets to use the amplification path when the voltage increases to at least 14 volts due to the hysteresis of the Schmidt trigger 112 circuitry. The circuit components, voltages and currents described above are by way of example and do not limit the invention to the particular components and circuit values detailed.

The dc current and voltage sensing circuit may use other means of detecting faults in the drop amplifier circuitry. For example, the integrated circuit amplifiers used to implement the forward and reverse amplifiers may include an output signal indicating normal operation of the amplifier. The dc current and voltage sensing circuitry could detect the loss of the normal operation signal and trigger the selection of the bypass path. In addition to sensing the dc voltage supplied to the unit, the dc voltage and sensing circuit may sample an ac supply voltage by rectifying and filtering the ac voltage to obtain a dc voltage representative of the ac supply voltage. The representative dc voltage may be compared to a reference and the results of the comparison may be used to control the bypass circuit.

Separate sensing resistors may be provided in the respective current paths supplying the forward and reverse amplifiers. By providing separate sensing resistors, and separate pairs of low and high current comparator circuits, the currents provided to the forward and reverse amplifiers can be monitored separately rather than as a combined value. The current set points of set of low and high current comparators are chosen based on the expected operating currents for the respective amplifier.

In another variation of the VoIP drop amplifier, the amplifier circuitry may include a forward amplifier but no reverse amplifier. This configuration is useful when user components such as a set top box or a cable modem generate reverse signals at sufficiently high levels so that amplification of the return signal from these user components.

It is to be understood that the present invention is not limited to the embodiments described above, but encompasses any and all embodiments within the scope of the following claims.

I claim:

1. A VoIP drop amplifier for connecting equipment to a broadband signal, the VoIP drop amplifier comprising:

an input connector for accepting a broadband cable signal from a cable system and returning broadband signals to the cable system;

a plurality of output connectors including at least one non-essential output connector and at least one essential input connectors, the at least one essential output connector including an output adapted for connection to VoIP telecommunication equipment;

an amplification path connecting the input connector to the plurality of output connectors, the amplification path having:
  a diplex filter for separating the broadband signal into return and forward signals;
  amplifier circuitry comprising a forward amplifier for amplifying the forward signals;
  a return path for the return signals; and
  a splitter for connecting signals traveling on the amplification path to each of the plurality of output connectors;

a bypass path connecting the input connector to the at least one essential output connector;

a switching circuit for switching between the amplification path and the bypass path; and a dc current and voltage sensing circuit connected to the switching circuit for to selecting the bypass path upon dc current and voltage sensing circuit detecting an abnormal condition and for selecting the amplification path when the dc current and voltage sensing circuit does not detect an abnormal condition, the dc current and voltage sensing circuit comprising:
  a circuit for detecting total dc current powering the amplifier circuitry;
  a first comparator circuit for comparing the total dc current powering the amplifier circuitry to a high current limit and generating a first output based on the comparison;
  a second comparator circuit for comparing the total dc current powering the amplifier to a low current limit and generating a second output based on the comparison, the low current limit being lower than the high current limit;
  a circuit for monitoring dc voltage supplied to the reverse amplifier and the forward amplifier, and
  a voltage comparator circuit for comparing dc voltage supplied to the amplifier circuitry to a low voltage limit and for generating an output based on the voltage comparison, the abnormal condition being detected when the first output exceeds the high current limit, the second output is less than the low current limit, or the output based on the voltage comparison detects dc voltage supplied to the amplifier circuitry less than the low voltage limit.

2. The VoIP drop amplifier according to claim 1, wherein said amplification path further comprises a reverse amplifier in the path for the return signals for amplifying the reverse signals.

3. The VoIP drop amplifier according to claim 1, wherein the switching circuit comprises an input RF switch having:
  a first normally open contact connected to the amplification path;
  a first normally closed contact connected to the bypass path; and
  a first common contact connected to the input connection, the input RF switch being operable to switch between connecting the first normally open contact to the first common contact, and connecting the first normally closed contact to the first common contact.

4. The VoIP drop amplifier according to claim 3, wherein the switching circuit comprises an output RF switch having:
- a second normally open contact connected to the amplification path;
- a second normally closed contact connected to the bypass path; and
- a second common contact connected to the at least one essential output connector, the output RF switch being operable to switch between connecting the second normally open contact to the second common contact, and connecting the second normally closed contact to the second common contact.

5. A VoIP drop amplifier for connecting equipment to a broadband signal, the VoIP drop amplifier comprising:
- an input connector adapted for accepting a broadband cable signal from a cable system and returning broadband signals to the cable system;
- a plurality of output connectors, the output connectors having at least one non-essential output connector and at least one essential output connector, the at least one essential output connector including an output adapted for connection to VoIP telecommunication equipment;
- an amplification path connecting the input connector to the plurality of output connectors, the amplification path having:
  - a diplex filter for separating the broadband signal into return and forward signals;
  - a forward amplifier for amplifying the forward signals;
  - a reverse amplifier for amplifying the return signals; and
  - a splitter for connecting signals traveling on the amplification path to each of the plurality of output connectors;
- a bypass path connecting the input connector to the at least one essential output connector;
- a switching circuit for switching between the amplification path and the bypass path; and
- a dc current and voltage sensing circuit connected to the switching circuit for selecting the bypass path upon the dc current and voltage sensing circuit detecting an abnormal condition, and for selecting the amplification path when the dc current and voltage sensing circuit detects the absence of an abnormal condition.

6. The VoIP drop amplifier according to claim 5, wherein said dc current and voltage sensing circuit further comprises
- a first circuit for sensing a first dc current powering the forward amplifier;
- a second circuit for sensing a second dc current powering the reverse amplifier;
- a first comparator circuit for comparing the first dc current powering the forward amplifier to a first high current limit and generating a first output based on the comparison;
- a second comparator circuit for comparing the first dc current powering the forward amplifier to a first low current limit and generating a second output based on the comparison, the first low current limit being lower than the second current high current limit;
- a third comparator circuit for comparing the second dc current powering the reverse amplifier to a second high current limit and generating a third output based on the comparison;
- a fourth comparator circuit for comparing the second dc current powering the reverse amplifier to a second low current limit and generating a fourth output based on the comparison, the second low current limit being lower than the second current high current limit;
- output generating circuitry for generating an abnormal condition detection output for detecting an abnormal condition, the abnormal condition detection output depending on the first output, the second output, the third output, and the fourth output.

* * * * *